March 18, 1969 W. W. DAVIS ET AL 3,433,975
PARAMETRIC AMPLIFIERS CASCADED IN A TRANSMISSION LINE ARRANGEMENT
Filed Oct. 11, 1960

INVENTORS
WILLIAM W. DAVIS
ARTHUR V. POHM
BY Cushman, Darby & Cushman
ATTORNEYS

United States Patent Office 3,433,975

Patented Mar. 18, 1969

3,433,975

PARAMETRIC AMPLIFIERS CASCADED IN A TRANSMISSION LINE ARRANGEMENT

William W. Davis, Minneapolis, Minn., and Arthur V. Pohm, Ames, Iowa, assignors to Sperry Rand Corporation, New York, N.Y., a corporation of Delaware Filed Oct. 11, 1960, Ser. No. 61,981

U.S. Cl. 307—88 1 Claim

Int. Cl. H03f 7/02

This invention relates to negative resistance generators of the parametric type, and particularly to a parametric amplifier and parametric oscillator.

Parametric devices have recently been receiving considerable attention due to the recent development of practical nonlinear low reactance elements such as capacitive elements obtained by using the transition region in back-biased junction diodes. Other reactance elements which have been employed in parametric devices are closed flux path ferrite magnetic cores, such as the conventional toroids, two such cores being necessary to make a parametric device. This means that at least a double volume is necessary, and more volume than that is required for a toroidal ferrite core parametric device, when compared to a single, open flux path, magnetic film parametric device constructed in accordance with this invention, since each magnetic film is considerably less in volume than a single ferrite core. Toroidal ferrite cores also have large demagnetizing fields, which in conjunction with their relatively large volume, necessitate such high excitation power levels as to make them impractical compared to the low power levels required not only by parametric diode circuits, but also by the magnetic film parametric devices of this invention. Magnetic films advantageously use the strong demagnetizing film normal to the plane of the film and at the same time have low internal losses because of the small volume.

Open flux path magnetic films and their preparation are well-known in the art. Usually, such films are referred to as being "thin" because their thickness is generally less than 10,000 Angstrom units, and may be as thin as a few Angstrom units. A preferred type of thin magnetic film for use in this invention, is a circular deposit of 81% nickel and 19% iron by weight, though the film need not be circular nor need it be of that composition. The main characteristic required of the film by this invention, is that it has a magnetic moment per unit volume, i.e., a magnetization vector, which is oscillatable, i.e., reversibly rotatable, preferably in the plane of the film. Preferably also, the film is a single domain, though it may have some small parasitic domains around its edges.

In one embodiment, a parametric amplifier according to this invention includes a bistable magnetic film of the sort above described, with a signal winding or line aligned substantially with its physical axis perpendicular to the easy axis of the film and a pump winding or line disposed transversely thereof. With the signal to be amplified applied to the signal winding in combination with a varying field affected by a pump winding, the magnetization vector of the film is caused to oscillate and effect across the terminals of the signal winding and effective negative resistance, providing amplification of the input signal.

An embodiment of an oscillator in accordance with this invention may be constructed similarly to the amplifier just described, with a condenser connected across the signal winding terminal. Preferably, the condenser is of such a value as to tune the signal winding to a frequency which is substantially one-half of the pump signal frequency. Basically, no signal need be applied to the signal winding to cause the oscillator to oscillate if the magnetization vector starts rotating due to any other cause, for example noise or the earth's field, since the reusltant signal induced in the signal winding is effective to cause a transverse field whereby the oscillation amplitude in the tuned circuit gradually increases causing self-sustaining oscillations therein which level off at an amplitude determined by the pump field amplitude and other characteristics of the device.

A parametric device constructed in accordance with this invention requires only a single film per element, and is further advantageous over the ferrite type parametric devices in that much higher frequency operation can be obtained, for example up to 10,000 mc., as compared to 2 to 6 mc. for the ferrite devices; no clock or pump frequency appears in the output, making the prior art filtering or bridge arrangements unnecessary; large external DC fields are not required; and the device can be fabricated entirely by vapor deposits, or in combination with printed or etched wiring. Since the pump and signal or output windings are perpendicular, there is no coupling therebetween due to air mutual inductance and hence the pump signal does not appear directly across the output. This means that a single film is useable, whereas prior art devices require double magnetic elements in bridge or filtering arrangements to cancel the pump signal which appears across the output of one of the elements. Another advantage of using a magnetic film is that the size of the signal and pump power needed is considerably smaller, since the magnetic film itself is a small element with very little total flux and the back EMF across the pump winding terminals is considerably reduced. Since metallic magnetic films are comparatively low loss devices, the operating frequency at which they will amplify or cause oscillation can be considerably higher than the operating frequency for ferrites. This is doubly true because the dissipation is less even though the dissipation volume is as great or greater, since the total amount of magnetic material of a film is much smaller than for ferrite devices. Furthermore, magnetic material in thin film form has a greater surface area for a given volume, and hence can radiate more power or conduct it to a suitable substrate.

For higher frequency of operation, this invention includes magnetically biasing the film elements as by the application of a constant magnetic field along the easy axis of the film. Without such a biasing, operation at an output frequency of 10 to 20 mc. may be obtained, and with the biasing, the frequency may be increased up to at least 10,000 mc.

It is accordingly an object of this invention to provide an improved negative resistance generator of the parametric type which requires only a single magnetic film that has an oscillatable magnetization vector, along with means for causing that vector to oscillate and provide an effective negative resistance.

It is a further object of this invention to provide, in conjunction with the foregoing object, a parametric amplifier, or a parametric oscillator wherein oscillations are controllable if desired between at least two phases 180° apart.

Still further objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figure 1:
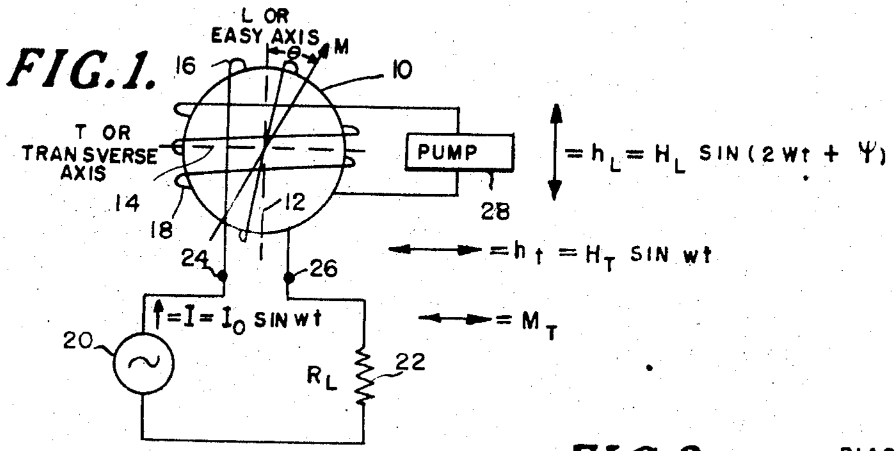
FIGURE 1 illustrates a parametric amplifier.

The parametric amplifier illustrated in FIGURE 1 includes a magnetic film 10 which has a longitudinal (L) or easy axis 12 and a transverse (T) axis 14. Wrapped around the film is a signal winding 16 and a clock or pump winding 18. As illustrated, these windings are mutually perpendicular, with the longitudinal or physical axis of the transverse winding being substantially in alignment or parallel with the easy axis 12, while the longitudinal or physical axis of the signal winding 16 is substantially in alignment or parallel to the transverse axis 14. Signal winding 16 is in series circuit with signal source 20 and load resistor 22, by virtue of its connection thereto via the two terminals 24, 26 of the signal winding. The transversely oriented winding 18 is connected to a clock or pump source 28.

Film 10 may be of the metal type described in the Rubens Patent 2,900,282. Preferably, it is an ultra thin element, for example, 10,000 Angstrom units or less in thickness, as formable by the vacuum deposition method of that patent. In such a case, the film is bistable with uniaxial anistropy resulting along the easy axis 12. The main characteristic of film 10, and of a film of the sort described by that patent, is that it has a magnetization vector M which is angularly oscillatable in the plane of the film, i.e., reversibly rotatable in either angular direction from an established position, such as from easy axis 12. When magnetization vector M lies along the easy axis and is pointed upwardly in FIGURE 1, film 10 is in one of its bistable states, while when the magnetization vector is pointed downwardly along the easy axis 12, the film is in its other bistable state. This invention does not require that the film be bistable, since, as will become apparent the film may be unistable or have more than two stable states, or even be isotropic. For the latter type of film, the magnetization vector does not normally lie in any given direction, but it may be established in a given position, as by magnetically biasing the vector to a position established by the bias.

Figure 2:
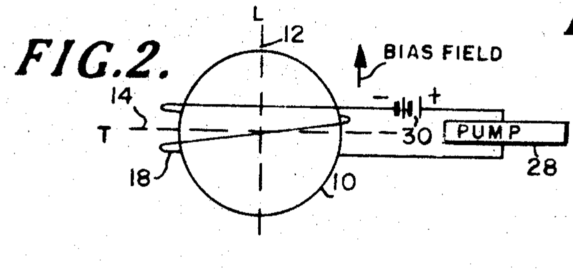
FIGURES 2 and 3 illustrate modifications of FIGURE 1, employing biasing means.
Figure 3:
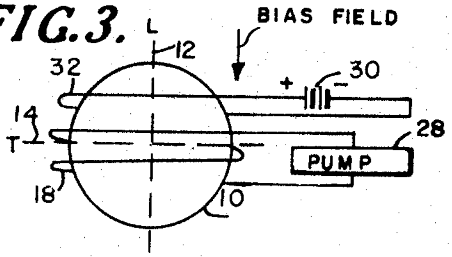

Bias may be applied to an isotropic film, or to an anisotropic film in any desired manner. For example, as illustrated in FIGURE 2, the bias is applied by a battery 30 in series with the pump winding 18 and pump source 28. Alternatively, as illustrated in FIGURE 3, battery 30 may be connected to a separate winding 32, which has its physical axis substantially parallel to the transverse axis 14. FIGURES 2 and 3 are shown only for the purpose of illustrating two different ways of applying the bias, and consequently do not show the FIGURE 1 signal winding 16 and its connections though such would normally be present. Other ways of magnetically biasing film 10, include the use of a permanent magnet, or a cube coil well known in the art. By orientation of the battery 30 in one direction or the other as respectively illustrated in FIGURES 2 and 3, or by oppositely wound bias windings, the biasing fields may be directed constantly along the easy axis, either upwardly as in FIGURE 2, or downwardly as in FIGURE 3. As will become apparent later herein, the biasing field is preferably in the same direction as the magnetization vector's rest direction used with this invention. When the film is anisotropic, so as to have any anisotropy field which establishes a preferred direction for the magnetization vector, for example upwardly along the easy axis 12 of FIGURE 2, the bias when in that same direction is additive to that anisotropy field and aids the anisotropy field in restoring the magnetization from a rotated position back toward the easy axis 12. This increases the speed of the reverse rotation of the magnetization vector. However, for operation at lower frequencies, for example below 20 mc., the bias is not necessary, for the anisotropy field itself is sufficient to return the vector back to the easy axis fast enough. With an isotropic film, however, the bias field not only establishes the preferred direction of magnetization, but also causes rotation of the magnetization back to the easy axis by itself, since no anisotropy field is present in such a film.

In operating, the parametric amplifier of FIGURE 1 causes an effective negative resistance to appear across terminals 24, 26 of the signal winding 16, thereby amplifying the signal of source 20 as received by load 22. Accordingly, the device may be considered as a negative resistor generator of the parametric type. When the pump winding 18 is oriented so that the field which it produces, is aligned exactly with the easy axis 12, no rotation of the magnetization vector M from the easy axis can be effected by that field alone. In practice, however, it is extremely difficult to orient the pump winding 18 so that the pump field is exactly parallel to the easy axis of the film, so consequently, there may be a very small component of the pump field which is parallel to the transverse axis 14, causing the magnetization vector to oscillate about easy axis 12 a small amount. Whether or not this occurs is relatively immaterial as to an amplifying embodiment of this invention, and as will later herein be apparent, slight misalignment of the pump winding may be advantageous for an oscillator when the output oscillation need not be controlled in phase.

In any event, when the source 20 is connected to signal winding 16 of FIGURE 1, the field produced by the signal winding is substantially in alignment with the transverse axis 14. This field, in conjunction with the pump field is sufficient to cause the magnetization vector to rotate from its easy axis. As long as the combined effect of these fields is not great enough to rotate the vector beyond the limit of any reversible rotation range which the film magnetization vector might have, the vector is automatically reversely rotated back toward the easy axis 12 when the signal field is removed. That is, with bistable films of the type described in the above mentioned Rubens patent, there is an inherent irreversible threshold which sets the limit of angular rotation of the magnetization vector for automatic reversible rotation thereof. If the vector is rotated to or beyond that limit, the vector proceeds to its other stable position so as to point downwardly in FIGURE 1. This situation is, by far, preferably avoided in the operation of an amplifier or oscillator in accordance with this invention. The angular value for the irreversible threshold may vary from film to film according to certain characteristics thereof as well known in the art. There is generally a considerable angular range, however, for example at least 30° of rotation from the easy axis, in which the vector may be rotated without the film being switched to its opposite state.

For purposes of describing FIGURE 1 it may be assumed that the input signal from source 20 and the pump signal from source 28 are sinusoidal. Under this condition, the magnetization vector of the film will rotate from its initially established position upwardly along axis 12, both clockwise and anticlockwise, i.e., ±30°, it being understood that vector M is not rotated beyond its reversible threshold limit in either a positive or negative angular direction. In other words, the magnetization vector is caused to operate about easy axis 12 with an oscillation amplitude less than the threshold for loss of the instant remanent magnetization condition or state. As the magnetization vector oscillates, signal winding 16 detects the transverse component $M_T$ of the magnetization variation, i.e., the varying magnetization vector component which is perpendicular to the signal winding 12. As long as winding 16 has its physical axis perpendicular to the transverse axis 14, i.e., its magnetic axis substantially parallel to transverse axis 14, the transverse magnetization component sensed by winding 16 is that component which is substantially parallel to transverse axis 14. This varies the inductance of winding 16, and in that sense the film is being used as a time variable inductor. As will be shown mathematically below, the varying transverse magnetization component $M_T$ is detected by winding 16 as a negative resistance, i.e., current from source 20 sees an effective negative resistance across terminals 24, 26. In that way, power and gain are effectively added to the input signal.

For purposes of the following mathematical analysis, it is assumed that film 10 of FIGURE 1 is a single domain. In practice the majority of films of the sort contemplated by the type described in the Rubens patent actually do exist as a single domain though there may be some parasitic domains around the edges of the film. Assuming sinusoidal operation, the transverse field $h_T$ applied in the plane of the film transverse to the easy axis 12 in response to an input signal from source 20, may be mathematically expressed as follows:

$$h_T = H_T \sin wt \qquad (1)$$

and the pump field due to the power or pump source 28 may be desired as:

$$h_L = H_L \sin (2wt + Ʉ) \qquad (2)$$

wherein Ʉ is a constant angle indicating any phase angle between the longitudinally applied field and the transversely applied field.

With a single domain bistable film, and a sine squared anisotropy energy assumed, the total film energy W may be described as:

$$W = K \sin^2 \theta - Mh_T \sin \theta - Mh_L \cos \theta \qquad (3)$$

wherein K represents the anisotropy constant of the film, M the magnetization vector, and $\theta$ the angle of rotation of M from the easy axis. If attention is confined to frequencies so low that damping may be neglected, then the M vector is at all times in equilibrium with the applied field, and the torque T is zero:

$$T = d_w/d\theta = 2K \sin \theta \cos \theta - Mh_T \cos \theta + Mh_L \sin \theta = 0 \qquad (4)$$

At small angles of $\theta$, for example 10° or less, cos $\theta$ is approximately equal to 1 and from Equation 4 then:

$$\sin \theta = \frac{h_T}{H_k - h_L} \qquad (5)$$

where $$H_k = \frac{2K}{M} \qquad (6)$$

$H_k$ represents the anistropy field of the film. To generalize Equation 5, $H_k$ may be replaced by $H'_k$ which includes any bias field $H_B$ of either polarity which may be present, i.e., $H'_k = H_k + H_B$. For small value of $h_L$, i.e., values of $h_L$ much less than $H_k$, and insufficient to cause switching of the film, Equation 6 becomes:

$$\sin \theta = \frac{h_T}{H_k}\left(1 - \frac{h_L}{H_k}\right) \qquad (7)$$

The voltage E across terminals 24, 26 of FIGURE 1 is:

$$E = N\frac{d\phi_T}{dt} \qquad (8)$$

with the transverse flux $\phi$ being $$\phi_T = A4\pi M_T \sin \theta \qquad (9)$$

where A is the film cross sectional area and $M_T$ is the transverse component of M as above indicated. Inserting into Equation 9 the values of sin $\theta$ as defined by Equation 7, and inserting the resultant into Equation 8, the voltage E across terminals 24, 26 becomes:

$$E = \frac{NA4\pi M_T}{H_k}\frac{d}{dt}h_T\left(1 - \frac{h_L}{H_k}\right) \qquad (10)$$

To obtain the power input P to winding 16 via terminals 24, 26, the integral $$P = \frac{1}{2\pi}\int_0^{2\pi} EId(wt) \qquad (11)$$

is formed, with $I = I_0 \sin wt$ being the input signal current and $H_T = aI_0$ where $a$ is a constant. Of the three resulting integrals one representing the ordinary reactance term is zero. The net or average value of the power input per cycle as given by the other two integrals is:

$$P = \frac{-\pi}{4H_k^2} I_0^2 aANM_T H_L w \cos Ʉ \qquad (12)$$

The minus sign in Equation 12 indicates that the power input to terminals 24, 26 from source 20, is effectively negative and implies that real power is being extracted from winding 16 via those terminals. This power is of the form $I^2R$, where R is a negative resistance of magnitude proportional to the peak pump amplitude $H_L$, which, of course, is proportional to the amplitude of the signal from pump 28. Equation 12 also indicates that the average power is a maximum when Ʉ=0, i.e., when cos Ʉ=1. Since the negative resistance term contains cos Ʉ, it is phase sensitive. That is, if Ʉ is made equal to $w_M t$, where $w_M$ is a frequency considerably lower than $w$, then the power will go through cyclic variations of angular frequency $w_M$. Consequently, when the pump field is modulated at an angular frequency $w_M$, the device of FIGURE 1 is a phase sensitive amplifier and acts similar to an FM demodulator, producing cyclic variations in the power which have a time period corresponding to the modulating frequency. When there is no modulating frequency present, there are no cyclic variations in the average power.

Another way of mathematically considering the device of FIGURE 1, to obtain additional information, is to express the voltage E across terminals 24, 26, as:

$$E = \frac{4\pi AMN}{H_k}\frac{dh_T}{dt} + \frac{4\pi AMN}{H_k^2}\frac{d}{dt}(h_L h_T) \qquad (13)$$

With $H_T = aI_0$, and remembering $E = LdI/dt$, it should be apparent that the first term in Equation 13 is the ordinary inductance term where:

$$L = \frac{4\pi AaNM}{H_k} \qquad (14)$$

The derivative in the second term of Equation 13 may be reduced to $$\frac{dt}{d}(h_L h_T) = H_L H_T w[\sin (wt + Ʉ) + 3 \sin wt \cos (2wt+)Ʉ] \qquad (15)$$

For the special case Ʉ=0, this may be further reduced to $$\frac{d}{dt}(h_L h_T) = H_L H_T w[+3/2 \sin 3wt - 1/2 \sin wt] \qquad (16)$$

Figures 4, 5:
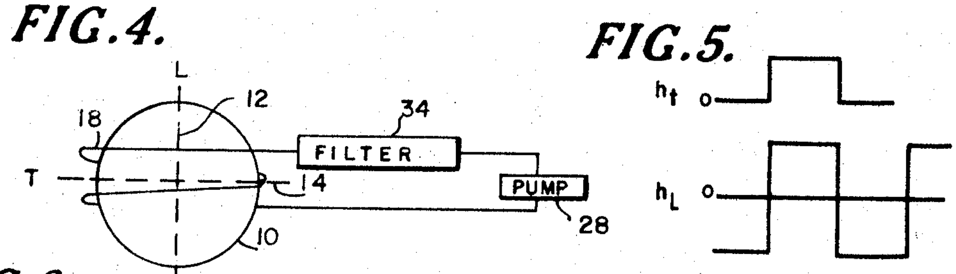
FIGURE 4 illustrates a modification employing a filter in the pump winding circuit.
FIGURE 5 shows waveforms for operating the amplifier of FIGURE 1 in a pulse mode.

The negative term in sin $wt$ is the term which gives rise to the negative power indicated in Equation 12. The other term in sin $3wt$ is the sum term, which represents a transfer of power from the signal source 20 to the clock or pump source 28. As shown in FIGURE 4, this power if found undesirable may be prevented from reaching the pump source 28 by the series filter 34. The more ideal the signal source, the less the need for filter 34. When a battery is in the pump winding circuit for purposes of magnetically biasing the film as above indicated, filter 34 is preferably disposed in the pump circuit so as to prevent any transfer of signal power not only to the pump, but also to the battery; that is, the battery would be disposed between pump 28 and filter 34. The filter may be made to parallel the pump winding 18, instead of being in series therewith, but this is not as desirable since the filter might then look like a short circuit and take energy from the circuit.

Although the derivation above has been carried though using sine waves, it is possible to operate FIGURE 1 using pulses, such as those illustrated in FIGURE 5. In this case the $h_T$ field is a pulse which tends to rotate the magnetization vector M of FIGURE 1, clockwise for example, and the $h_L$ field concurrent with that transverse field pulse is such as to rotate M still further clockwise, but not beyond the reversible rotation range. When the $h_T$ field is removed, the $h_L$ may likewise be removed as long as the film is anisotropic in nature, so as to cause the magnetization vector to rotate back toward the easy axis, but preferably the $h_L$ field is bipolar so that the negative-going pulse in FIGURE 5 helps return M to the easy axis its equilibrium position. During the next cycle of the pump field $h_L$, another $h_T$ pulse may be received by amplification purposes, effecting a 1:1 ratio between the $h_T$ and $h_L$ field. On the other hand, it is preferable to operate the device with a 2:1 frequency ratio between the $h_L$ and $h_T$ pulses. In either case, successive $h_T$ pulses may be of the same polarity or of opposite polarities. That is, the $h_T$ pulses which would occur, for example in the third cycle of $h_L$, may be either positive like the illustration, or negative since a negative pulse will rotate the magnetization from its easy axis the same as the positive $h_T$ pulse but in the opposite direction, and the concurrent pump field pulse, though positive, will rotate M still further. Although square waves are indicated in FIGURE 5, it should be apparent that the device of FIGURE 1 operates similar to the operation therefor as described above relative to sine waves since square waves contain a Fourier fundamental sinusoidal component as is well known. When the transverse field pulses are all of the same polarity, the magnetization vector oscillates only to one side of the easy axis, meaning that the vector oscillates about a mean axis which does not coincide with the easy axis. With sinusoidal operation in which the magnetization vector varies substantially an equal amount to both sides of the easy axis, it is generally preferable to have the signal winding 16 and pump winding 18 at a right angle to each other, so that they will be substantially decoupled except via the rotating vector, i.e., no air mutual inductance coupling. With unipolar pulses to be amplified, however, it should be seemingly desirable to orient winding 16 so that its physical axis is parallel with the mean axis of reversible rotation of the magnetization vector, but this would increase the air coupling between the windings of 16 and 18 themselves. Consequently, the physical axis of winding 16 may be disposed to compromise between the undesirable coupling of the windings and the desirable directivity of the signal pulse $h_T$. In any pulse mode operation, a biasing field may be added, and generally such field would be substantially parallel to the $h_L$ field or the mean axis of the reversible rotation as desired, whether that is along the easy axis or not.

Although the above mathematics is based on using small angles, for example $\theta = 10°$ or less, the device of FIGURE 1 will operate for angles larger than that, for example up to at least 30°.

Figure 6:
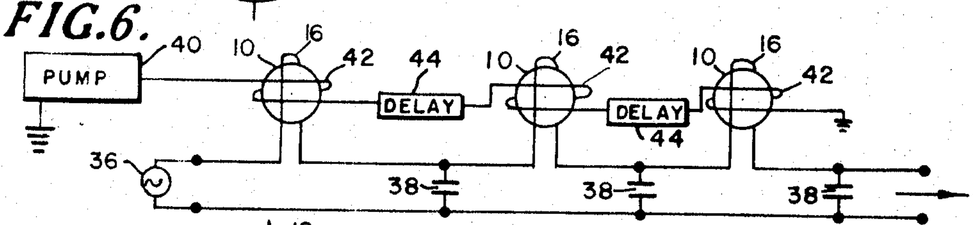
FIGURE 6 shows a plurality of parametric amplifiers cascaded in a transmission line arrangement to obtain increased gain.

When the operation of the device of FIGURE 1 is based on small signals, the gain from a single film inductor is rather small. To increase the gain, one may increase the amplitude of the pump field, as may be noted by Equation 12 above. On the other hand, or in addition, the film inductors may be cascaded, as illustrated in FIGURE 6. In this figure the arrangement takes the form of a transmission line, such as a distributed amplifier, with the film elements forming the respective series inductance in each section of the transmission line. The signal to be amplified is derived from source 36 which is connected to the input end of the transmission line. Each section of the transmission line includes a film 10 with a signal winding 16 whose physical axis is oriented along the transverse axis of the respective film. The windings 16 are connected in series with the transmission line to form the input inductances respectively for the sections thereof, with each section having a parallel connected output condenser 38. In FIGURE 6, the pump source 40 supplies the pump winding 42, on each of the different films, with the pumping signal, successive windings 42 being serially connected by a delay element 44, so that the pump field applied to any one of the films is appropriately timed to compensate for the inherent delay in each transmission line section. Operation of each of the film units in FIGURE 6, is similar to that described above, relative to FIGURE 1, with each winding 16 in FIGURE 6 effectively appearing as a negative resistance to the input signal of its section, and causing amplification thereof. Although the circuit of FIGURE 6 is useful also if the input signal is applied at the opposite end of the transmission line, the gain of the line is considerably reduced because the phase relationship between the pump and input signals is then different for any given set of values for delay elements 44. The gain per section of the cascaded structure of FIGURE 6 is still described by an equation similar to those already given, as in Equation 12. It will be observed from that equation, that the gain is a linear function of $w$. To the extent that the propagation velocity is not a function of frequency, it will be seen that as the frequency is increased, the wave length decreases and the gain per wave length remains constant.

Figure 7:
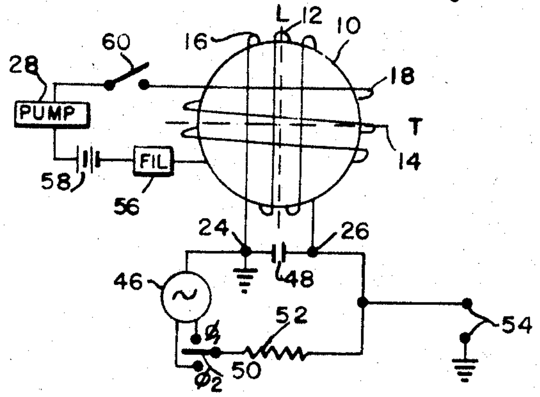
FIGURE 7 is an embodiment of a parametric oscillator in accordance with this invention.

As above indicated this invention is also applicable as a parametric oscillator, for example of the type illustrated in FIGURE 7. Here again, the signal winding 16 preferably has its physical axis aligned with traverse axis 14, while the physical axis of the pump winding 18 is aligned with the easy axis 12. In this embodiment, there is not so much concern about amplification as in the FIGURE 1 embodiment, and in fact no signal source 46 need be connected to signal winding 16 to obtain oscillation when switch 60 is closed so that pump 28 can supply a pumping field to winding 18, as long as condenser 48 is connected across terminals 24, 26. That is, even if there is no misalignment whatsoever of the magnetic axis of pump winding 14 with the easy axis 12, an oscillating current may be developed in the tuned circuit including winding 16 and condenser 48, if a small transverse flux is induced in any way into film 10, as by noise or the earth's magnetic field. Such a small component may also be derived from the normally present trasnverse field component due to slight misalignment of the pump winding 18. In any event, the presence of a small transverse field is sufficient to start oscillation of the tank circuit, with each cycle of such oscillation being effective to cause a large transverse field by amplification, as described relative to FIGURE 1 during a build-up time at the end of which the tank circuit oscillations are limited in amplitude by the characteristic of the overall device. As for FIGURE 1, an effective negative resistance is developed across the signal winding 16. The tank circuit oscillation may have either of at least two possible phases which may be indistinguishable in respect to the pump field, but which may be distinguished and controlled in phase by employing a weak signal generator 46 whose output is either of phase $\phi_1$ or $\phi_2$, these phases being substantially 180° apart. That is, when switch 50 is connected to convey a phase $\phi_1$ signal to terminals 24, 26 via resistor 52, a load resistor, then oscillation in the tank circuit will be of phase $\phi_1$. On the other hand, the oscillation across output terminals 54 will have a phase 180° different than $\phi_1$, when switch 50 is connected to the $\phi_2$ output control signal from source 46. The control signal from source 46 need only be applied momentarily to effect its phase control function, though it may be on continuously if desired.

Preferably, the tank circuit including winding 16 and condenser 48 is tuned to, or at least near to a given frequency which is harmonically related to the frequency of the pump field, for self-sustaining oscillation. More preferably, the tank circuit is tuned to one-half the pump frequency, so that the voltage E across terminals 24, 26 contains a signal of frequency $w$ compared to twice the frequency of the pump, whereby the device may be considered as generating a subharmonic clock or pump frequency. As above indicated, the subharmonic oscillation has two phases and this makes possible the performing of binary logic, as proposed by Von Newmann in his Patent 2,815,488. The oscillator is also useful as a memory element or digital repeater. It functions logically as a majority element. That is, that phase of the oscillations of the oscillator is dependent upon the net resulting phase of the sum of its inputs. Accordingly, the control signal generator 46 of FIGURE 7 may be replaced by a plurality of generators of different phases and connected together in such a manner that the combined output thereof is the net phase of each of the signals. This logical function of the majority decision, when combined with the amplifying property of giving more output than required from the setting or control input, makes the device a self-consistent digital computing element.

As above indicated, the externally injected control signal, i.e., the signal from source 46 in FIGURE 7, may be considerably smaller than the signal resulting in the oscillator at the end of the build-up signal, and may be considerably smaller than the signal from the pump generator 28. On the other hand, the control signal may be as large as desired. In any case, filter 56 may be placed in the pump winding circuit to keep the control signal from being coupled back into the pump or battery 58, if such is necessary or desired. Once the device is in oscillation, the phase of the oscillation may be changed by moving switch 50 to its other position, if the amplitude of the control signal from generator 46 is sufficient to overcome the signal within the oscillator. If the signal from generator 46 is quite weak, however, then the pump signal must be keyed off, as by the opening of switch 60, before the new phase of the control signal can be effective to control the oscillation once switch 60 is again closed.

Battery 58 may be employed or not, as desired, and if it is used, it may be poled to cause a constant biasing field in either direction along the easy axis. Of course, any of the other biasing means above discussed may be used. If the biasing field adds to the anisotropy field, then the ferromagnetic resonance frequency of the film is raised. Likewise, if the biasing field opposes the anisotropy field, the resonance frequency of the film is lowered, and when the two opposing fields are equal, the device (whether it is the oscillator of FIGURE 7, or the amplifier of FIGURES 1 or 6) is in an unstable state. The frequency limitation of the parametric device is determined by its ferromagnetic resonance, i.e., the frequency at which the structure comprising the film is resonant. Since gain is a linear function of frequency, it would seem necessary to operate at higher and higher frequencies in order to obtain more and more gain. However, the frequency must not be so high that the magnetization vector fails to follow the applied field. This will occur when the frequency approaches the frequency of ferromagnetic resonance. With no external applied field, resonance may be expected to occur somewhere in the vicinity of 250 mc. to 350 mc., for example, dependent of $H_K$ among other things. To operate at higher frequencies, the aforementioned DC magnetic biasing field may be applied along the easy axis to aid the restoring action of $H_K$. However, in this case, the value of the biasing field adds to $H_K$ to appear in the denominator of the gain expression Equation 12 so that the gain is reduced.

Alternately, the reverse process, i.e., with the biasing field opposing the anisotropy field, may be employed at lower frequencies to increase the gain. Experiments in this mode of operation have been conducted in the range of 10 to 100 mc. As above indicated, when the signals become large so that the bias is increased to the point of being equal and opposite to the anisotropy field, the device develops an unstable state where the resonance of the film is zero. At this point, there can be rotational switching of the film. Consequently, as the bias is increased toward the value of the anisotropy field, there is an approach to the ordinary reversal-by-rotation case, where the limiting value of field $H_L$ is the coercive force. The signal then has a non-linear effect, in that it must exceed a certain threshold value determined by the coercive force before rotational switching takes place and once initiated larger signals do not cause a greater total flux change. Further, it has been found that as the ferromagnetic resonance frequency is lowered, there is a tendency of the film to switch its magnetization by wall motion at least to some degree, since it involves larger angles of $\theta$ and larger flux changes and so is considerably slower and more lossy.

It has also been found that the oscillator embodiment of this invention exhibits a hysteresis effect as between its output and the amplitude of the pump field. That is, once the amplitude of the pump field reaches a certain value as it is being increased, the oscillator will oscillate with a given amplitude of output and will continue to oscillate as the pump field amplitude is increased. At a certain point of pump field amplitude the output oscillation amplitude increases rather suddenly and tends to level off. Upon decreasing the pump amplitude field then, the oscillation continues and finally at a pump amplitude field considerably less than the amplitude thereof at which the oscillation amplitude increased, the oscillation amplitude rather suddenly decreases. If the pump amplitude is decreased below the effective film coercivity, oscillation may stop but the circuit may still act as a amplifier. This signifies that the presence of the condenser 48 in FIGURE 7 is not itself conclusive that the circuit is an oscillator, for it may be operated in an amplifying mode as a tuned amplifier which is capable of breaking into oscillation whenever the pump field is sufficiently increased in amplitude.

The equations above set forth are applicable not only to parametric amplifier constructed in accordance with this invention, but also to an oscillator of the type illustrated in FIGURE 7. Another set of equations which is equally applicable to the parametric amplifier and oscillator of this invention, begins with the well-known Gilbert modification of the Landau-Lifshitz equation, and which takes into account the gyromagnetic ratio $g$ and the damping constant $\alpha$. Using the assumptions that the angle $\theta$ which is the angle the magnetization vector makes with the easy axis in the plane of the film, and the angle $\phi$ which is the angle the magnetization vector makes with the plane of the film, are both small so that the component of M perpendicular to the film is approximately equal to $M\phi$ and $\sin\theta$ is approximately equal to $\theta$; that the $H_L$ and $H_T$ fields are much less than the saturation magnetization $4\pi$ which is generally at least 80,000 gausses; that the saturation magnetization $4\pi M$ times the gyromagnetic ratio is much larger than twice the damping constant times the frequency of oscillation, with $\alpha$ being approximately equal to 0.02 and $g$ being equal to $1.76\times10^7$ (oersted-sec.)$^{-1}$; that $H_L$ is less than or equal to 10 oersteds, so the frequency of oscillation times $H_L$ is much less than $2\times10^{12}$ oersteds/sec.; and that $h_T$ is, for convenience, a cosine function and equal to $h_T \cos wt$, with $h_L$ being defined as previously indicated; the following equation for the resistance R of winding 16 is valid for frequencies up to 10,000 mc.

$$R=\frac{4\pi MN^2aAw\left(\frac{aw}{g}-1/2H_L\cos \Psi\right)\times10^{-9}}{\left[H_k\frac{-(1+a^2)w^2}{4\pi Mg^2}\right]^2+\left(\frac{\alpha w}{g}\right)^2-(1/2H_L)^2} \quad (17)$$

wherein $a$ and A are constants as defined for Equation 12 above, and N is the number of turns in the signal winding 16 in either FIGURE 1, FIGURE 6 or FIGURE 7. From Equation 17, it may be noted that R becomes negative when the peak amplitude of the pump field is increased above $H_L=2\alpha w/g$ and then if the pump field is large enough that R is greater than the positive load resistance connected across the signal winding 16 in FIGURE 7, oscillation will occur, if the constant component of the reactance of winding 16 is tuned out by an external reactance, such as effected by condenser 48. For oscillator applications the circuit may be tuned so that $\Psi$ is either 0 or $\pi$. The first case holds when the denominator of Equation 17 is positive, the second case when it is negative.

Thus it is apparent that the various objects and advantages herein set forth are successfully achieved. Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claim.

What is claimed is:

1. A parametric amplifier for amplifying an input signal comprising a transmission line for receiving said signal at an input end and having a plurality of successive sections each including a series inductance and a parallel capacitance, each of said inductances comprising a magnetic film and a conductor magnetically coupled thereto and connected in series with said line in its respective said section with each conductor being responsive to said input signal as present at the input of its respective section for applying a first field to the respective film, each of said films having an angularly oscillatable magnetization vector, and means for applying to each film and crosswise of the respective first field a second field timed and phased to coact with its respective first field to cause the magnetization vector of each film to oscillate and make each said section conductor look like a negative resistance to the input signal as received by that section, whereby the output of each section is an amplified version of the input signal received by that section.

References Cited

UNITED STATES PATENTS

| | | | |
|---|---|---|---|
| 3,123,717 | 3/1964 | Hewitt et al. | 307—88 |
| 3,126,486 | 3/1964 | McMillan | 307—88 |
| 2,962,676 | 11/1960 | Marie | 330—5 |
| 2,984,795 | 5/1961 | Robillard | 332—51 |
| 2,988,636 | 6/1961 | Frost | 330—5 |
| 2,984,825 | 5/1961 | Fuller et al. | 340—174 |

FOREIGN PATENTS

| | | |
|---|---|---|
| 822,471 | 10/1959 | Great Britain. |

OTHER REFERENCES

Proceedings of National Electronics Conference, 1959, “Magnetic Film Parametric Amplifiers,” published Mar. 21, 1960; pp. 65–78.

Electronics, pp. 92, 94, 95, Nov. 13, 1959, “Parametric Amplifier Use Thin Films.”

Electronics, pp. 78, 80, Feb. 26, 1960, “Thin Film Balanced Modulator.”

STANLEY M. URYNOWICZ, Jr., *Primary Examiner.*

U.S. Cl. X.R.

330—4.8; 332—29